(12) United States Patent
Ku et al.

(10) Patent No.: US 7,432,816 B1
(45) Date of Patent: Oct. 7, 2008

(54) PRINTED CIRCUIT BOARD WITH RFID ANTENNA

(75) Inventors: Joseph Ku, Palo Alto, CA (US); Geoff Lyon, Menlo Park, CA (US); Salil Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 11/249,674

(22) Filed: Oct. 13, 2005

(51) Int. Cl.
*G08B 13/14* (2006.01)
*H05K 7/00* (2006.01)
*H05K 1/18* (2006.01)

(52) U.S. Cl. .................. 340/572.7; 340/572.1; 361/736; 361/737; 361/760; 361/761; 361/764

(58) Field of Classification Search .................. None
See application file for complete search history.

(56) References Cited

U.S. PATENT DOCUMENTS

| | | | |
|---|---|---|---|
| 6,164,551 A | 12/2000 | Altwasser | |
| 6,249,227 B1* | 6/2001 | Brady et al. | 340/572.1 |
| 6,459,588 B1* | 10/2002 | Morizumi et al. | 361/737 |
| 6,861,993 B2 | 3/2005 | Waldner | |
| 2003/0042316 A1* | 3/2003 | Teraura | 235/487 |
| 2006/0109119 A1* | 5/2006 | Burr et al. | 340/572.1 |
| 2006/0226985 A1* | 10/2006 | Goodnow et al. | 340/572.1 |

OTHER PUBLICATIONS

Eberle, H., "Radioport: A Radio Network for Monitoring and Diagnosing Computer Systems", SMLI TR-2002-117, Oct. 2002.
Smith, D., "What Do You Know About Capacitive Voltage Sensors?", EC&M, Aug. 1, 2005, http://ecmweb.com/mag/electric_know_capacitive_voltage/index.html.
New Serial Presence Detect (SPD) EEPROM from STMicroelectronics Fully Supports JEDEC DDR2 Standard, May 27, 2004.http://www.st.com/stonline/press/news/year2004/p1461.htm.
"Understanding DDR Serial Presence Detect (SPD) Table" Jul. 14, 2003, http://www.simmtester.com/page/news/showpubnews.asp?num=101.

* cited by examiner

*Primary Examiner*—Julie Lieu

(57) ABSTRACT

A printed circuit board (PCB) includes an antenna for an RFID chip. An RFID chip for a tag is operable to be placed on the PCB such that the RFID chip is connected to the antenna and is operable to use the antenna to transmit data.

17 Claims, 4 Drawing Sheets

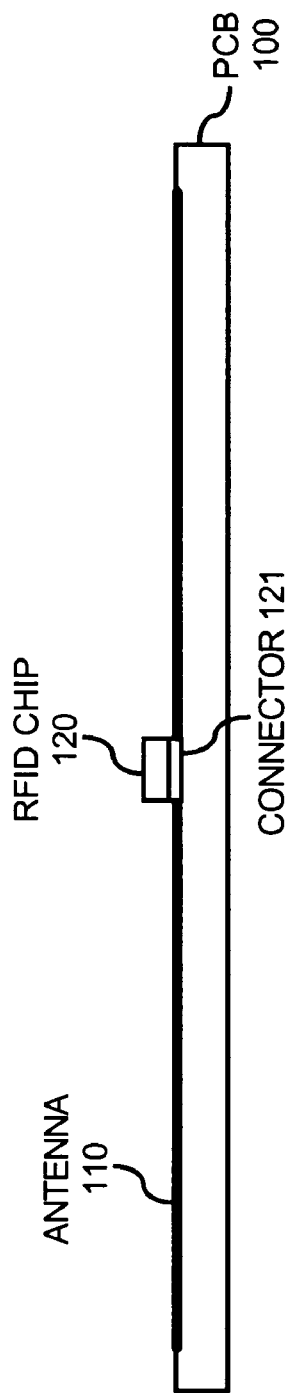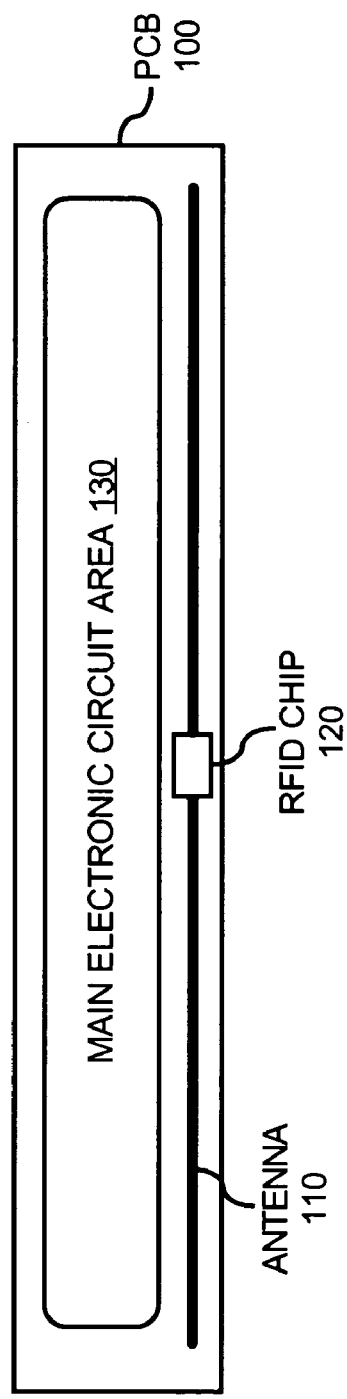

PRINTED CIRCUIT BOARD WITH RFID ANTENNA

BACKGROUND

Radio frequency identification device (RFID) systems are widely used for tracking and other applications in many different types of industries. A typical RFID system includes RFID tags and an RFID reader that reads information from the RFID tags. For example, the RFID reader includes a transmitter that outputs radio frequency (RF) signals through an antenna to create an electromagnetic field that the tags perturb to return their stored information to the reader. Some types of conventional tags are "passive" tags, such as tags without an internal power source that may be energized by the electromagnetic field generated by the reader, and "active tags", such as tags with an internal power source.

Many RFID systems use tags to track goods. For example, a tag is attached to a palette of goods. The palette of goods is tracked using readers at various points in the supply chain. For example, a tag attached to a palette of goods in a warehouse is read to determine a unique identification for the palette of goods and possibly information about the goods. The information may be provided to inventory and tracking software for tracking the palette of goods through the supply chain.

It is known to provide tags on labels, and the labels may be attached to palettes of goods or large packaging, such as a box of goods. These labels may be large enough to accommodate an RFID antenna in the tag such that a reader may read the tag from a convenient distance. For RFID tags that use RF coupling, optimum antenna lengths are generally a function of the energizing signals wavelength.

Typically, tags are not provided on individual items. For example, components of a system, such as memory modules, processor chips, graphics cards, etc., may not be individually tagged, and thus may not be individually tracked before or after being delivered to a customer. One reason could be the relatively large size of the tag, which includes the antenna connected to an RFID chip. The size of the tag may not be able to be reduced because the antenna should be large enough to allow the tag to be read from a convenient distance. The tag may not fit on a label for an individual good or there may be no available surface for placing a tag on an individual good. Thus, it is difficult to track individual goods using an RFID system. Another possible reason tags are not provided on individual items is cost. A manufacturer or retailer may not be able to justify the cost of tag or the cost of adding a tag to individual goods, especially if profit margins are slim for a particular good.

SUMMARY

A printed circuit board (PCB) includes an antenna for an RFID chip. An RFID chip for a tag is operable to be placed on the PCB such that the RFID chip is connected to the antenna and is operable to use the antenna to transmit data.

BRIEF DESCRIPTION OF THE DRAWINGS

Embodiments are illustrated by way of example and not limitation in the accompanying figures in which like numeral references refer to like elements, and wherein:

FIG. 1 shows a side view of a PCB with an antenna, according to an embodiment;

FIG. 2 shows a top view of the PCB with antenna shown in FIG. 1, according to an embodiment;

DETAILED DESCRIPTION

Figure 3:
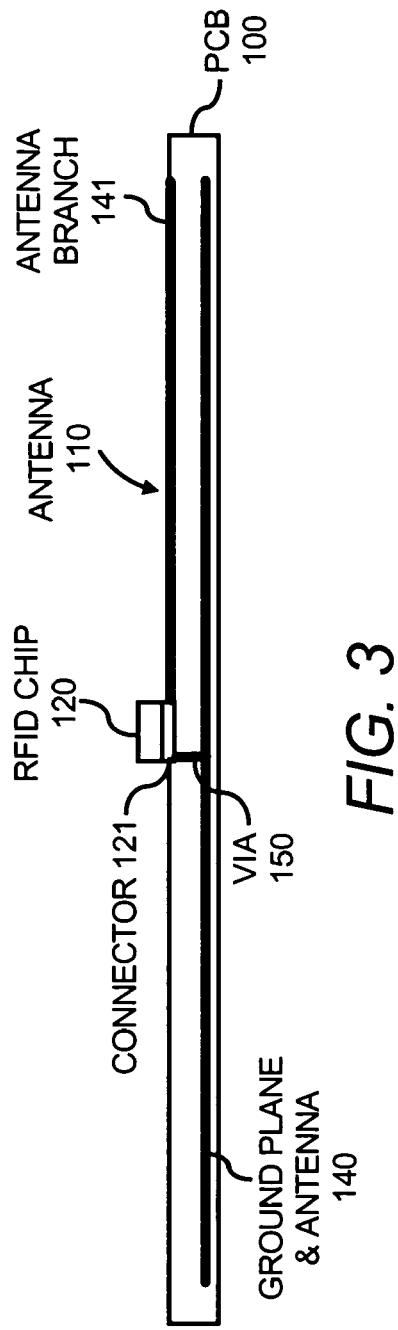
FIG. 3 shows a side view of a PCB with an antenna, according to another embodiment.

For simplicity and illustrative purposes, the principles of the embodiments are described. However, one of ordinary skill in the art would readily recognize that the same principles are equally applicable to, and can be implemented with, variations that do not depart from the true spirit and scope of the embodiments. Moreover, in the following detailed description, references are made to the accompanying figures, which illustrate specific embodiments.

According to an embodiment, an RF antenna is provided on a PCB. The RF antenna may be an antenna for an RFID circuit. In one embodiment, the RF antenna on the PCB is an external antenna for the RFID circuit. For example, an RFID tag typically includes an RFID circuit which may be provided on an RFID chip, and an internal antenna. According to an embodiment, the RF antenna provided on the PCB may be used instead of an internal antenna provided with the tag. Thus, RFID chips not requiring an internal antenna may be used, allowing for use of RFID chips produced in much smaller sizes than conventional RFID tags with internal antennas. Thus, the RFID chip may be included on individual items having a PCB, such as memory modules, processor chips, circuit boards, graphic cards, etc., which may typically not be able to accommodate a large RFID tag. This allows these individual items to be tracked or be used with other RFID applications. Furthermore, there may be little or no additional cost to manufacture the PCB with an RF antenna. The external RFID antenna provided on a PCB, according to an embodiment, is not limited to only tagging individual goods, and may be provided on any item having a PCB. In addition, the cost of an RFID chip, not including an antenna, may be less than an RFID tag with an antenna. The reduced cost of using an RFID chip instead of an RFID tag may make it possible to tag and track individual goods. Furthermore, generally, using an RFID chip with an external antenna on a PCB may educe the costs of tagging goods, regardless of whether the goods are tagged individually or in groups, such as tagging boxes or palettes. Then, the tagged goods may be tracked. Also, the RFID chips may be used to store unique identifiers or manufacturer identifiers that can be used to minimize counterfeiting.

Figure 7:
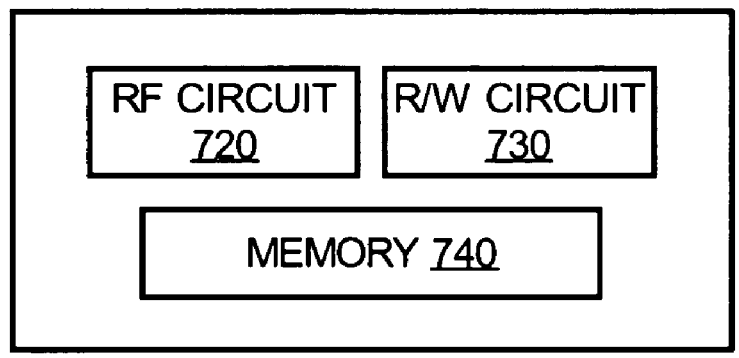
FIG. 7 illustrates an example of an architecture of the RFID chip that may be used in the embodiments.

FIG. 1 illustrates a side view of a PCB 100 with an antenna 110, according to an embodiment. This side view is a cross-section of the PCB 100 also shown in FIG. 2. A connector 121 is provided on the PCB 100. The connector 121 is operable to receive an RFID chip 120. The RFID chip 120, for example, includes an RFID circuit for an RFID tag. The RFID circuit may be an integrated circuit provided as a chip, such as the RFID chip 120, or provided in another form on the PCB 100. The RFID circuit includes conventional circuits in an RFID tag, such as memory, possibly a power source if the RFID chip 120 is an "active" tag, and other known circuits for receiving and transmitting data via the antenna 110 and possibly for writing to the RFID chip 120. Also, for example, the RFID chip 120 may include circuits for an "active tag", "passive"

tag, or "semi-passive" tag. A conventional RFID tag typically includes an RFID chip and an antenna. The RFID chip 120 uses the antenna 110 to transmit data and possibly receive data. The antenna 110 is external to the RFID chip 120, so the RFID chip 120 may be smaller than a conventional tag that includes an antenna. An example of an architecture for the RFID chip 120 is shown in FIG. 7.

The connector 121 is electrically connected to the antenna 110, so that when the RFID chip 120 is placed in the connector 121, the RFID chip 120 may use the antenna 110 to transmit data. The RFID chip 120 may also receive data via the antenna 110 in some embodiments. For example, the RFID chip 120 may be operable to receive data and write data to memory or the RFID chip 120 may be operable to receive data and compare received data to stored data before performing a function, such as for security purposes.

The connector 121 is optional. In one embodiment, the PCB 100 may be manufactured with the antenna 110, and the RFID chip 120 is provided on the PCB 100 and is electronically connected to the antenna 110 without using the connector 121. In another embodiment, the connector 121 is provided on the PCB 100. In this embodiment, the manufacturer or a third-party may connect the RFID chip 120 to the PCB board 100 and the antenna 110, for example, after manufacturing the PCB 100. The PCB 100 and the antenna 110 provide an inexpensive way to include an RFID tag on electronic components that include a PCB. Furthermore, the manufacturer or a third-party after manufacturing has the choice of adding an RFID chip. For example, the manufacturer of PCBs may include an antenna, such as the antenna 110, on every PCB because the cost of including the antenna 110 on a PCB is low. However, the manufacturer may decide not to include an RFID chip on the PCBs to avoid the cost of the RFID chips. A third-party, after manufacturing, can either include the RFID chip on the PCB or not. For example, the PCBs may include connectors, such as the connector 121, allowing the third-party to quickly and cheaply connect an RFID chip to the PCBs if needed.

In one embodiment, the connector 121 comprises surface-mount technology (SMT) pads that provide a placeholder for the RFID chip. For example, the RFID chip 120 may be a surface mount component that can be mounted on the SMT pads after manufacturing the PCB 100 by soldering or using other known surface-mount techniques. This embodiment of the connector 121 comprising SMT pads may be cheaper than providing a conventional, full-size connector that receives the pins of an RFID chip, which may be used in another embodiment. In some instances, the SMT pads may receive an RFID chip with pins, but the pins would be much shorter than pins that are designed to mate with a full-size connector.

FIG. 2 illustrates a top view of the PCB 100 shown in FIG. 1. The PCB 100 includes a main electronic circuit area 130 away from the antenna 110 and the RFID chip 120. An item or good, such as a computer system or an electronic component, may include the PCB 100 and the main electronic circuit area 130 where the circuits for the electronic component are provided. The electronic component may be tagged with the RFID chip 120 and the antenna 110 for tracking or for performing other known RFID applications.

The main electronic circuit area 130 may not be electrically connected to the antenna 110 and the RFID chip 120. In one embodiment, the antenna 110 and the RFID chip 120 are located along an edge of the PCB 100 such as shown in FIG. 2. For example, the antenna 110 may include two traces on an outer layer of the PCB 100 that form branches of the antenna 110 with the RFID chip 120 between the two branches. The antenna 110 may be provided in other locations on the PCB 100 away from the main electronic circuit area 130. For example, the antenna 110 may be provided on a side surface of the PCB 100, along any of the edges of the PCB 100, on a bottom surface of the PCB 100, or at least a portion of the antenna 110 may be provided on an inner layer of the PCB 100.

According to another embodiment, shown in FIG. 3, at least a portion of a ground or power plane for the PCB 100 is used for the antenna 110. FIG. 3 shows a side view of the PCB 100 in this embodiment. This side view may be a cross-section of the view shown in FIG. 4. FIG. 3 shows a ground plane 140 for the PCB 100. The ground plane 140, which may be provided on an inner layer of the PCB 100, is one branch of the antenna 110. The other branch of the antenna 110, such as shown as 141, may be provided on an outer layer of the PCB 100. The branch 141 may also be provided on an inner layer of the PCB 100. A via 150 provides an electrical connection between the ground plane 140 and the RFID chip 120. In one embodiment, to avoid energizing the circuits in the main circuit area 130, the ground plane 140 or a power plane of the PCB 100 is used as one branch of the antenna 110 and not for both branches of the antenna 110.

The embodiment shown in FIG. 3 uses one of the existing conductive planes in the PCB 100 as at least a portion of the antenna 110. Using a larger reference plane for the antenna 110, such as a ground or power plane, may improve the sensitivity of the antenna 110. Furthermore, less space is needed to provide the antenna.

Figure 4:
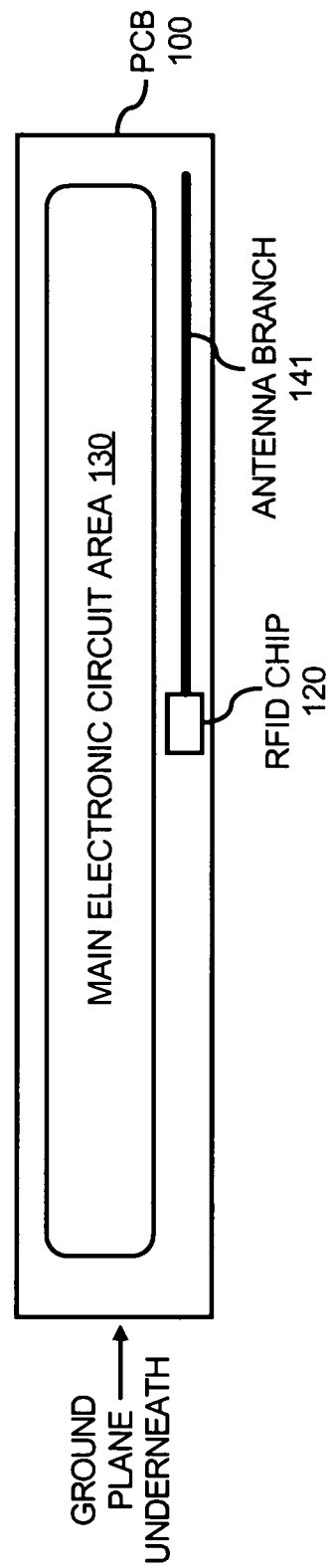
FIG. 4 shows a top view of the PCB with antenna shown in FIG. 3, according to an embodiment.

FIG. 3 illustrates a side view of one embodiment of the PCB 100 and the antenna 110. FIG. 4 illustrates a top view of the embodiment shown in FIG. 3.

Figure 5A:
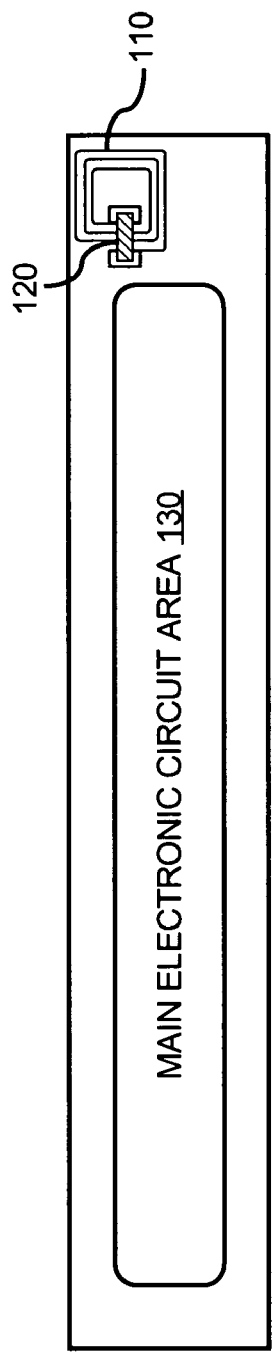
FIG. 5A shows a top view of a PCB with antenna, according to yet another embodiment.
Figure 5B:
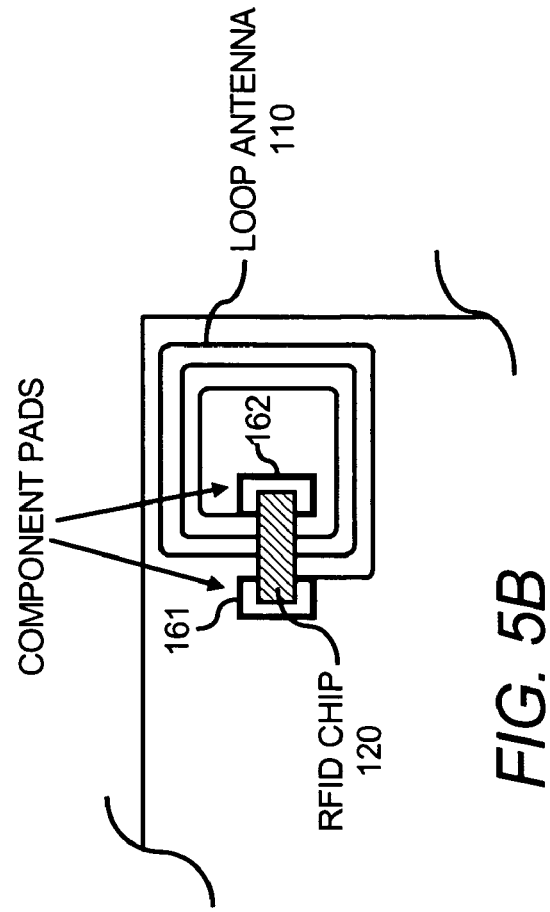
FIG. 5B shows a more detailed view of the antenna shown in FIG. 5, according to an embodiment.

FIGS. 5A-B illustrate an embodiment of the PCB 100 and the antenna 110 where the antenna 110 is formed as an inductive loop structure, including at least one loop. This is typically for high frequency (HF) RFID implementations. Other types of antennas, such as dipole antennas, are typically for ultra-high frequency (UHF) or higher frequency RFID implementations. For example, FIGS. 1-4 illustrate embodiments that show the antenna 110 as a dipole antenna, which is generally a straight antenna. FIGS. 5A-B show the antenna as a loop antenna, which is also a common antenna type for HF RFID tags. FIG. 5A shows a top view of the PCB 100. The antenna 100 is an inductive loop antenna which may include multiple loops. One or more of the loops may be provided on an outer layer of the PCB 100, an inner layer of the PCB 100 or loops may be provided on an outer and an inner layer of the PCB 100. The antenna 110 is shown away from the main electronic circuit area 130, such as in a corner of the PCB 100. The antenna 110 may be provided in other locations on the PCB 100 away from the main electronic circuit area 130.

FIG. 5B shows the antenna 110 and the RFID chip 120 connected to the antenna 110 in more detail. For example, component pads 161 and 162 may be used to place the RFID chip 120 over the loops, and ends of the loops are electrically connected to the RFID chip 120. Alternatively, a more complex multi-layered inductive loop structure may be used that places the RFID chip 120 away from the antenna 110 to improve its sensitivity. Optionally a capacitor could be added to more precisely tune the loop antenna 110 to the energizing frequency. A connector may also be used, such as the connector 121 shown in FIG. 1 for connecting the RFID chip 120 to the antenna 110 and the PCB 100.

Figure 6:
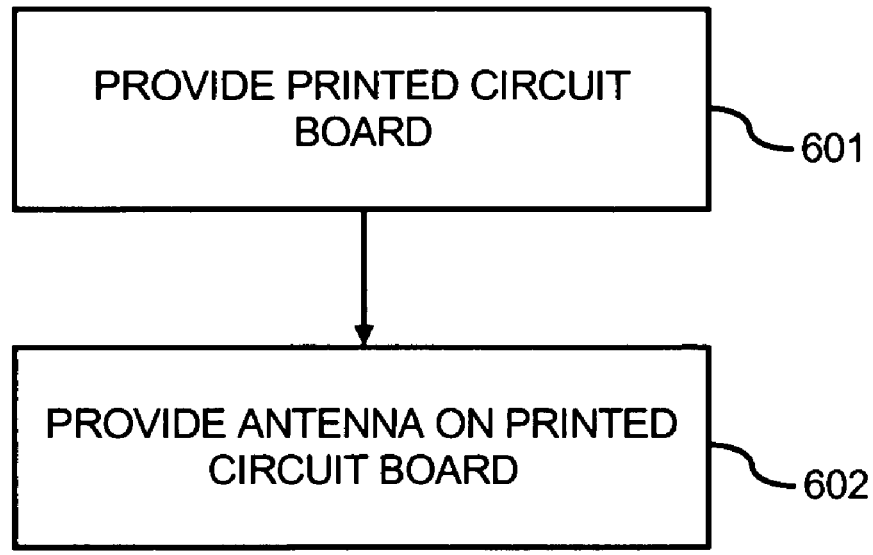
FIG. 6 shows a flow chart of a method for manufacturing a PCB with an antenna, according to an embodiment.

FIG. 6 illustrates a flowchart of a method 600 for manufacturing or providing a PCB with an antenna, according to an embodiment.

At step 601, a PCB is provided. At step 602, an antenna on the PCB is provided. For example, the antenna may be formed on an outer layer, an inner layer, or a combination of layers on the PCB during manufacturing of the PCB. In one embodiment, at least a portion of the antenna is comprised of the power plane or ground plane for the PCB. The antenna is operable to be used with an RFID chip. Embodiments of the antenna on the PCB are described above with respect to FIGS. 1-5.

Other steps that are optionally included in a method of manufacturing or providing a PCB with an antenna include providing a connector for the RFID chip, such that the connector is operable to receive an RFID chip and connect the RFID chip to the antenna. Another step includes providing an RFID chip on the PCB, which may be connected via the connector. The RFID chip may be provided on the PCB during manufacturing of the PCB or after manufacturing the PCB. Also, an item, which may include a good such as electronic component, may be manufactured including the PCB and the antenna.

It will be apparent to one of ordinary skill in the art that the embodiments described above with respect to FIGS. 1-6 are not limited to the type of antennas shown in the respective figures, and dipole antennas, loop antennas or other types of conventional antennas for RFID tags may be used.

FIG. 7 illustrates an example of an architecture of the RFID chip 120 shown in FIG. 1. The RFID chip 120 may include an RF circuit 720, a read/write (R/W) circuit 730, and a memory 740. The RFID chip 120 may be "passive", "active" or "semi-passive". The components shown in FIG. 7 are examples of some components that may be included in the RFID chip 120. One or more of the components shown in FIG. 7 may not be used and/or other components may be included in the RFID chip 120.

The RF circuit 720 is a circuit for demodulating received information and modulating information transmitted from the RFID chip 120. The R/W circuit 730 controls the reading from the memory 740 and the writing to the memory 740. The memory 740 may be a write-once memory or may be a re-writable memory, such as a flash memory.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. An apparatus comprising:
a printed circuit board (PCB); and
an antenna on the PCB, wherein at least a portion of the antenna is provided inside of the PCB and is connected to the RFID chip through at least one via,
wherein a radio frequency identification device (RFID) chip is operable to be placed on the PCB such that the RFID chip is connected to the PCB and the antenna and is operable to transmit data via the antenna.

2. The apparatus of claim 1, further comprising:
a connector on the PCB connecting the RFID chip to the antenna, wherein the connector includes an interface allowing the RFID chip to be mounted on the PCB after the PCB and the antenna on the PCB are manufactured.

3. The apparatus of claim 1, wherein the antenna is provided on an outer layer of the PCB.

4. The apparatus of claim 3, wherein the antenna is provided along an edge of the PCB.

5. The apparatus of claim 1, wherein the at least a portion of the antenna comprises a ground plane or a power plane for the PCB.

6. The apparatus of claim 1, wherein the antenna comprises a dipole antenna.

7. The apparatus of claim 1, wherein the antenna comprises at least one loop.

8. The apparatus of claim 1, further comprising:
a main electronic circuit area, wherein at least one electronic circuit is provided on the PCB in the main electronic circuit area.

9. The apparatus of claim 8, wherein at least a portion of the antenna is provided on a surface of the PCB, and the at least a portion of the antenna is located away from the main electronic circuit area on the surface.

10. A method of manufacturing a PCB having an antenna, the method comprising:
providing a PCB; and
providing an antenna on a layer of the PCB, wherein an RFID chip on the PCB is operable to use the antenna to transmit or receive information,
wherein providing an antenna on a layer of the PCB further includes
providing at least a portion of the antenna on an inner layer of the PCB; and
providing at least one via in the PCB to connect the at least a portion of the antenna on the inner layer to the RFID chip, and the at least one via connects the at least a portion of the antenna on the inner layer of the PCB to another portion of the antenna on an outer layer of the PCB.

11. The method of claim 10, further comprising:
providing a connector on the PCB, wherein the connector is operable to receive the RFID chip and connect the RFID chip to the antenna, and wherein the connector includes an interface allowing the RFID chip to be mounted on the PCB after the PCB and the antenna on the PCB are manufactured.

12. The method of claim 10, wherein providing an antenna on the PCB further comprises:
providing a trace on an outer layer of the PCB.

13. The method of claim 12, wherein providing a trace on an outer layer of the PCB further comprises:
providing the trace along an edge of the PCB.

14. The method of claim 10, wherein the at least a portion of the antenna comprises a ground plane or a power plane for the PCB.

15. The method of claim 10, wherein the antenna comprises one of a dipole antenna and a loop antenna.

16. An apparatus comprising:
a PCB
a main circuit area on the PCB including at least one circuit;
an antenna on the PCB;
an RFID chip not including an internal antenna and electrically isolated from the main circuit area, wherein the RFID chip is connected to the antenna and is smaller than an RFID tag having an internal antenna and at least a portion of the antenna is provided inside of the PCB and is connected to the RFID chip through at least one via; and
a connector on the PCB connecting the RFID chip to the antenna, wherein the connector includes an interface allowing the RFID chip to be mounted on the PCB after the PCB and the antenna on the PCB are manufactured.

17. The apparatus of claim 16, wherein the at least a portion of the antenna comprises a ground plane or a power plane for the PCB.

* * * * *

UNITED STATES PATENT AND TRADEMARK OFFICE
CERTIFICATE OF CORRECTION

PATENT NO. : 7,432,816 B1  
APPLICATION NO. : 11/249674  
DATED : October 7, 2008  
INVENTOR(S) : Joseph Ku et al.

Page 1 of 1

It is certified that error appears in the above-identified patent and that said Letters Patent is hereby corrected as shown below:

In column 2, line 37, delete "large" and insert -- larger --, therefor.

In column 2, line 49, delete "educe" and insert -- reduce --, therefor.

Signed and Sealed this

Fifth Day of May, 2009

JOHN DOLL  
*Acting Director of the United States Patent and Trademark Office*